(12) United States Patent
Kamiwada et al.

(10) Patent No.: US 7,142,207 B2
(45) Date of Patent: Nov. 28, 2006

(54) HIERARCHICAL SORTING OF LINKED OBJECTS IN VIRTUAL THREE-DIMENSIONAL SPACE

(75) Inventors: Toru Kamiwada, Kawasaki (JP); Takushi Fujita, Kawasaki (JP); Takuya Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 95 days.

(21) Appl. No.: 10/817,006

(22) Filed: Apr. 5, 2004

(65) Prior Publication Data

US 2004/0183797 A1     Sep. 23, 2004

Related U.S. Application Data

(63) Continuation of application No. PCT/JP01/09052, filed on Oct. 15, 2001.

(51) Int. Cl.
*G06T 15/00* (2006.01)

(52) U.S. Cl. .................... 345/419; 345/421; 345/422

(58) Field of Classification Search ............... 345/419, 345/420, 421, 422
See application file for complete search history.

(56) References Cited

U.S. PATENT DOCUMENTS

| | | | | |
|---|---|---|---|---|
| 5,280,568 A | | 1/1994 | Obata | ........................ 345/421 |
| 5,363,475 A | * | 11/1994 | Baker et al. | ................ 345/422 |
| 5,977,977 A | * | 11/1999 | Kajiya et al. | ................ 345/418 |
| 6,326,964 B1 | * | 12/2001 | Snyder et al. | ............... 345/419 |

FOREIGN PATENT DOCUMENTS

| | | |
|---|---|---|
| JP | 3-071277 | 3/1991 |
| JP | 5-035883 | 2/1993 |
| JP | 5-174123 | 7/1993 |
| JP | 6-119462 | 4/1994 |
| JP | 6-203172 | 7/1994 |
| JP | 9-305791 | 11/1997 |

OTHER PUBLICATIONS

Nishida, Tomoyuki, et al., "An algorithm for Half-Tone Representation of Three-Dimensional Objects by Using a Priority Table", *Joho Shori Gakkai Ronbunshi*, vol. 24, No. 4, pp. 429-435.

* cited by examiner

*Primary Examiner*—Phu K. Nguyen
(74) *Attorney, Agent, or Firm*—Staas & Halsey LLP (57) ABSTRACT

An information processing apparatus displays a plurality of linked objects in a virtual three-dimensional space in accordance with field-of-view data. The information processing apparatus includes control means for generating images of the objects in accordance with the object data and in accordance with the field of view and rendering the generated images onto a two-dimensional frame. The control means hierarchically sorts the objects in accordance with link data which indicates links between the objects. The control means renders the image of one object and the image of another object to which the one object is linked, wherein the image of the other object is rendered before the start of or after the end of rendering the one object or between the start and the end of rendering.

7 Claims, 9 Drawing Sheets

HIERARCHICAL SORTING OF LINKED OBJECTS IN VIRTUAL THREE-DIMENSIONAL SPACE

This application is a continuing application, filed under 35 U.S.C. §111 (a), of International Application PCT/JP01/09052, filed Oct. 15, 2001.

FIELD OF INVENTION

The present invention generally relates to rendering images of three-dimensional objects, and more particularly to hierarchically sorting a plurality of linked objects in a virtual three-dimensional space for efficiently rendering images of the objects.

BACKGROUND OF THE INVENTION

Today, a shopping mall is provided on a Web page on the Internet. Such a shopping mall may be a virtual three-dimensional world. A number of three-dimensional commodity objects are disposed within a virtual shop object in the shopping mall. In accordance with a virtual three-dimensional image displaying program, a server machine or a client machine may generate images in the virtual three-dimensional shopping mall for displaying. One of the objects within the virtual shopping mall may be linked to another one of the objects by means of a URL.

A conventional virtual three-dimensional image displaying program is operative to dispose objects in a virtual three-dimensional space in accordance with sets of object data representative of three-dimensional shapes and positions of the objects, and to project the objects on a two-dimensional plane in accordance with a field of view of a user in the space to thereby generate corresponding two-dimensional images. When two objects partially overlap with each other as viewed from the user's viewpoint, the images of these objects must be generated so that the overlapping portion of one object which is deeper or farther from the viewpoint hides behind the other object which is shallower or closer to the viewpoint. Meanwhile, when there is disposed a semi-transparent object, the images of the objects must be generated so that the objects behind the semi-transparent object can be seen through the semi-transparent object.

The Z buffer algorithm is typically used in order to properly process relative overlapping of objects as viewed from the viewpoint. In accordance with this algorithm, for rendering the images of objects onto a two-dimensional frame buffer memory, the objects are separated into elemental polygons, and Z-values representative of positions of a plurality of polygons of the objects relative to the viewpoint are stored in a so-called Z buffer. For rendering pixels of two or more object polygons at the same pixel locations onto the two-dimensional frame buffer memory, in accordance with the algorithm, the Z-values of the object polygons are compared with each other and only the pixels of one of the object polygons that is closest to the viewpoint are ultimately stored at the locations. For rendering an image of a semi-transparent object, a so-called alfa blending method is used to render, onto the frame buffer memory, values representative of a color of the pixels of the semi-transparent object blended with colors of the pixels of other object polygons disposed behind the semi-transparent object in accordance with the degree of the transparency of the semi-transparent object.

According to the Z buffer algorithm and the alfa blending method, for rendering the image of the semi-transparent object, the objects must be rendered in order of the distance from farther object polygons to closer object polygons relative to the viewpoint. For this purpose, before the rendering, a so-called Z sorting method is used to first determine the distances of all of the displayed object polygons from the viewpoint and then sort the object polygons in accordance with the distances.

SUMMARY OF THE INVENTION

In accordance with one aspect of the present invention, an information processing apparatus displays a plurality of linked objects in a virtual three-dimensional space in accordance with field-of-view data. The information processing apparatus includes control means for generating images of the objects in accordance with the object data and in accordance with the field of view and rendering the generated images onto a two-dimensional frame. The control means hierarchically sorts the objects in accordance with link data which indicates links between the objects, for the rendering.

In an embodiment of the invention, the control means may render the images and/or partial images of the objects in order determined by the hierarchical sorting. The control means may render images and/or partial images of objects of a group of one object and one or more other objects to which the one object is linked, in order of the distance from the viewpoint.

In accordance with another aspect of the invention, an information processing apparatus includes control means for generating images of the objects in accordance with the object data stored in the memory and rendering the generated images onto a two-dimensional frame. The control means renders the image of one object and the image of another object to which the one object is linked. The image of the other object is rendered before the start of or after the end of rendering the one object or between the start and the end of rendering.

In an embodiment of the invention, the control means may render the image or partial images of the one object and the image of the other object in accordance with the distance from the viewpoint.

In accordance with a further aspect of the invention, an object data processing method is for displaying a plurality of linked objects in a virtual three-dimensional space in accordance with field-of-view data. The method includes the step of hierarchically sorting the objects in accordance with link data which indicates links between the objects, the step of generating images of the objects in accordance with the object data and in accordance with the field of view, and the step of rendering the generated images onto a two-dimensional frame in order determined by the hierarchical sorting.

In accordance with a still further aspect of the invention, an object data processing method includes the step of generating images of the objects in accordance with the object data, and the step of rendering the generated images onto a two-dimensional frame. The step of rendering includes rendering the image of one object and the image of another object to which the one object is linked. The image of the other object is rendered before the start of or after the end of rendering the one object or between the start and the end of rendering.

In an embodiment of the invention, the methods above may be implemented in the form of programs which can be executed by an information processing apparatus.

According to the invention, a plurality of linked three-dimensional objects can be sorted in an advantageous manner, and images of a plurality of linked three-dimensional objects can be efficiently rendered. According to the invention, not all polygon surfaces are required to be sorted.

DESCRIPTION OF THE PREFERRED EMBODIMENTS

In the conventional algorithm above, when a number of objects are arranged in a virtual three-dimensional space, a long time and a large memory resource are required to sort object polygons thereof. Thus the sorting may not be desirable for real-time displaying of three-dimensional images.

The inventors have recognized that hierarchical sorting of a plurality of linked three-dimensional objects can provide efficient rendering of images of the objects.

An object of the present invention is to efficiently render images of a plurality of three-dimensional objects.

Another object of the invention is to sort a plurality of linked three-dimensional objects in an advantageous manner to render images of the objects.

Figure 1:
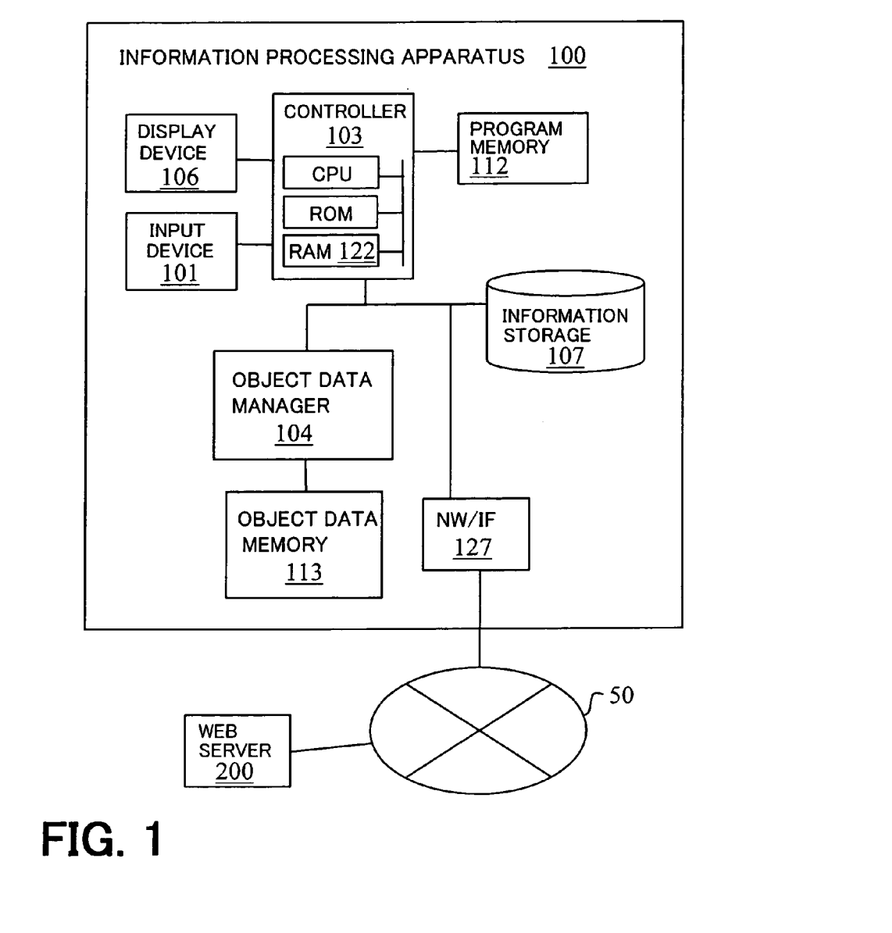
FIG. 1 shows a configuration of an information processing apparatus in accordance with an embodiment of the present invention.

FIG. 1 shows the configuration of an information processing apparatus 100 in accordance with an embodiment of the present invention. The information processing apparatus 100 includes an input device 101, a controller or processor 103, an object data manager 104, a display device 106, an information storage device 107, an program memory 112, an object data memory 113, and a network interface 127 connected to a Web server 200 via a network 50.

The information processing apparatus 100 displays, on the display device 106, a plurality of linked three-dimensional objects which are arranged in a virtual three-dimensional space.

A three-dimensional object is formed of one or more polygon surfaces, each polygon surface typically having an outer side surface and an inner side surface. A curved surface may be expressed typically by a plurality of polygon surfaces.

A three-dimensional object is formed by one or more polygons, and visually represents, in a virtual three-dimensional space, any item of information content handled as a unit, such as a single text document, a document containing text and graphics, an image, a stream of motion pictures, a three-dimensional image made up of a plurality of parts, an audio stream or the like.

The network 50 typically consists of the Internet, a local area network (LAN), a telephone network including a mobile communication network, a cable, TV network, a power line carrier communication network, a fiber optic network and/or the like.

The controller 103 includes a CPU, a RAM 122 and a ROM. The controller 103 operates in accordance with programs stored in the program memory 112, such as a browser program to implement the browser function. The controller 103 may be a processor, the browser function of which is implemented in the form of an integrated circuit. The object data manager 104 may be implemented as a processor which operates in accordance with a program for object data management, or as a processor which has a function of the management implemented in the form of an integrated circuit.

When content data is required for displaying an object, the controller 103 captures the content data from the Web server 200 via the network interface 127 over the network 50 and provides the captured content data to the object data manager 104. The controller 103 may capture the required content data from the information storage device 107. The object data manager 104 stores the captured object data set in the object data memory 113 and manages the object data set.

The input device 101 provides, to the controller 103, input data such as a URL and field-of-view data in response to operation by a user. Upon receipt of the field-of-view data, the controller 103 holds the field-of-view data, and updates the field-of-view data in accordance with user's input data.

For generating a displayed image, the controller 103, in accordance with the object data set stored in the object data memory 113, generates in real time an object image which changes as the field-of-view moves, and displays the object image on the display device 106.

Figure 2:
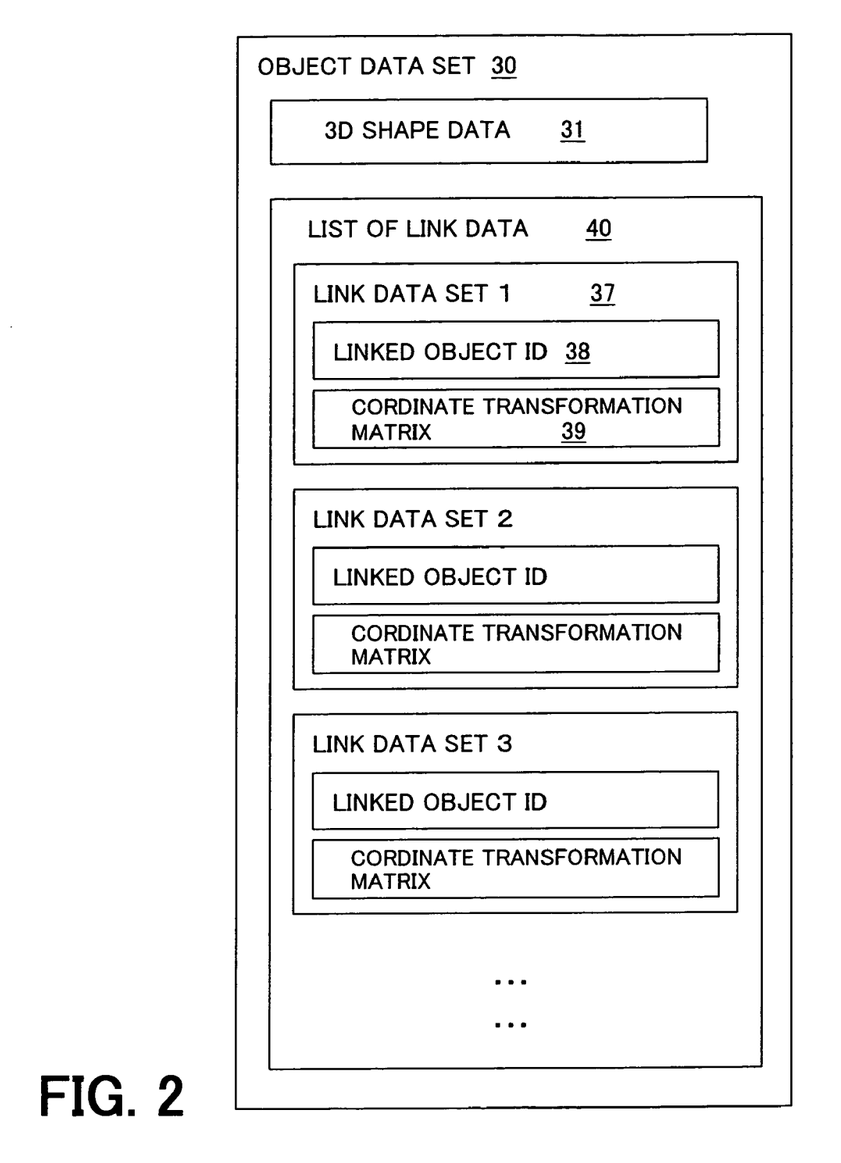
FIG. 2 shows the structure of an object data set of an object.

FIG. 2 shows the structure of an object data set 30 of an object. The object data set 30 contains at least data 31 representative of a three-dimensional shape of the object. When a current object having the data set 30 is linked to another subsequent object, the object data set 30 contains a list of link data 40. The other object to be linked to has a position which is associated with the current object. The list of link data 40 contains one or more link data sets 37. The link data set 37 contains an identification 38 of the other object which indicates a link to the other object and a coordinate transformation matrix 39 for transforming the coordinates of the other object into the coordinates of the current object. The object data set 30 may be linked to a plurality of objects. Thus, the object data set 30 may contain a plurality of link data sets as shown in the figure.

Figure 3:
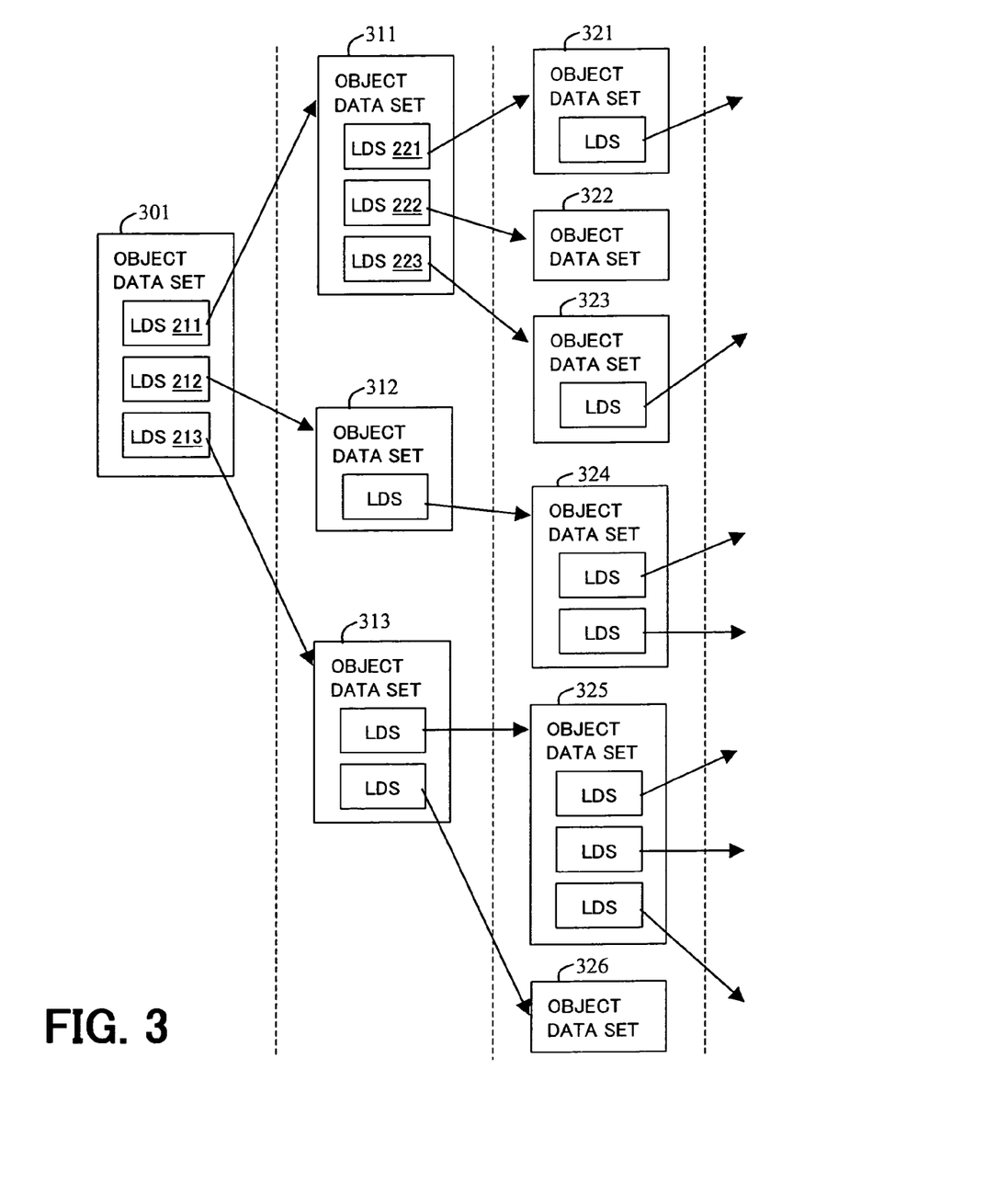
FIG. 3 shows the hierarchy of a plurality of linked objects which are represented by a plurality of respective linked object data sets.

FIG. 3 shows the hierarchy of a plurality of linked objects which are represented by a plurality of respective linked object data sets. These objects are sorted in accordance with the hierarchy, for rendering.

In FIG. 3, an object data set 301 of a starting object includes three link data sets 211, 212 and 213 which contain respective identifications of the other objects to be linked to.

The starting object is linked to the other three objects which have respective object data sets 311, 312 and 313. The object data set 311 has three link data sets 221, 222 and 223. The object having the object data set 311 is linked to three objects which have respective object data sets 321, 322 and 323. The object having the object data set 312 is similarly linked to an object which has an object data set 324. The object having the object data set 313 is linked to two objects which have respective object data sets 325 and 326. The objects having the object data sets 321, 323, 324 and 325 are linked to further objects. The objects having the object data sets 322 and 326 are not linked to further objects.

As described later in greater detail, it is possible to efficiently render the images of the plurality of linked objects onto a frame memory area of the RAM 122 in accordance with the hierarchically-layered objects.

Figure 4:
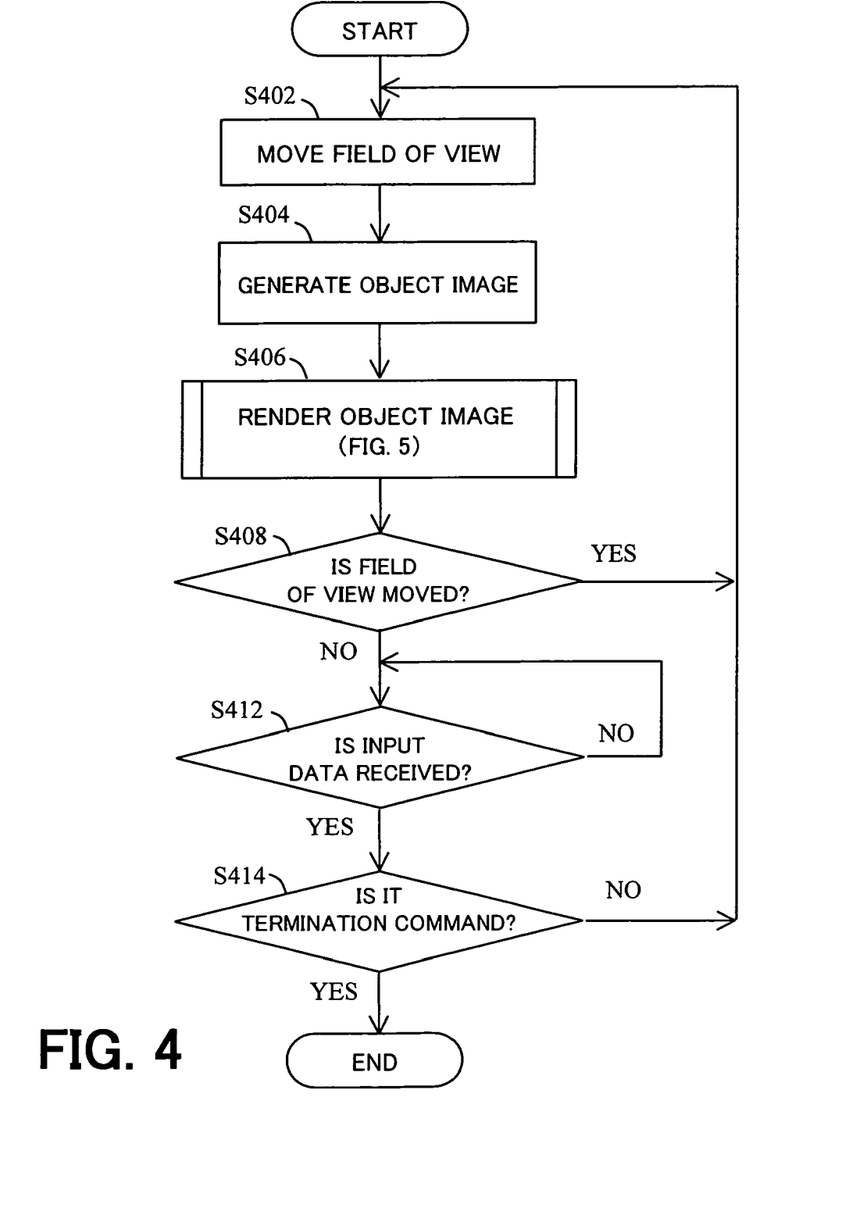
FIG. 4 is a schematic flow chart for generating and rendering images of the objects that is executed by the controller in accordance with a three-dimensional Web browser program.

FIG. 4 is a schematic flow chart for generating and rendering the images of the objects that is executed by the controller 103 in accordance with the three-dimensional Web browser program.

The controller 103 captures the object data set of an initial object and the object data sets of other subsequent objects which are directly or indirectly linked to the initial object via the network 50 or from the information storage device 107 in accordance with a URL entered by a user, and stores the captured object data sets in the object data memory 113 via the object data manager 104. After that, the controller 103 generates and renders the images of the objects in accordance with the flow chart of FIG. 4.

At Step 402, the controller 103 acquires data of a viewpoint and a field of view that is entered through the input device 101, for example a mouse, and moves the viewpoint and the field of view relative to the virtual three-dimensional space in accordance with the data.

Figure 6:
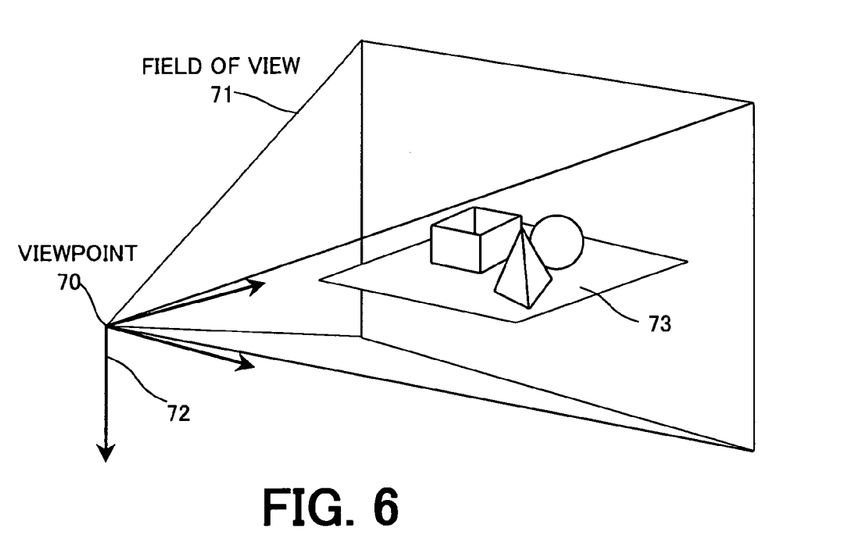
FIG. 6 shows an example of the geometrical relationships between a field of view of a user and objects.

FIG. 6 shows an example of the geometrical relationships between a field of view of a user and objects. In this figure, the field of view 71 is defined in the virtual three-dimensional space and information objects 73 are arranged in the space. A fixed field-of-view coordinate system 72 is defined relative to the field-of-view 71. Further, a viewpoint 70 is defined at the location of the origin of the field-of-view coordinate system 72. The geometrical relationships of the objects relative to the field-of-view can be defined, for example, with a transformation matrix for transforming the local coordinate systems of the objects into the field-of-view coordinate system 72.

At Step 404, in accordance with the viewpoint and the field of view, the controller 103 determines positions of the respective objects in the virtual three-dimensional space in accordance with the respective object data sets 30 stored in the object data memory 113, and generates two-dimensional images of the respective objects and stores them in the RAM 122. For this purpose, when a required object data set has not been stored yet in the object data memory 113, the controller 103 captures the required object data set into the object data memory 113 via the network interface 127 or from the information storage device 107.

Figure 5:
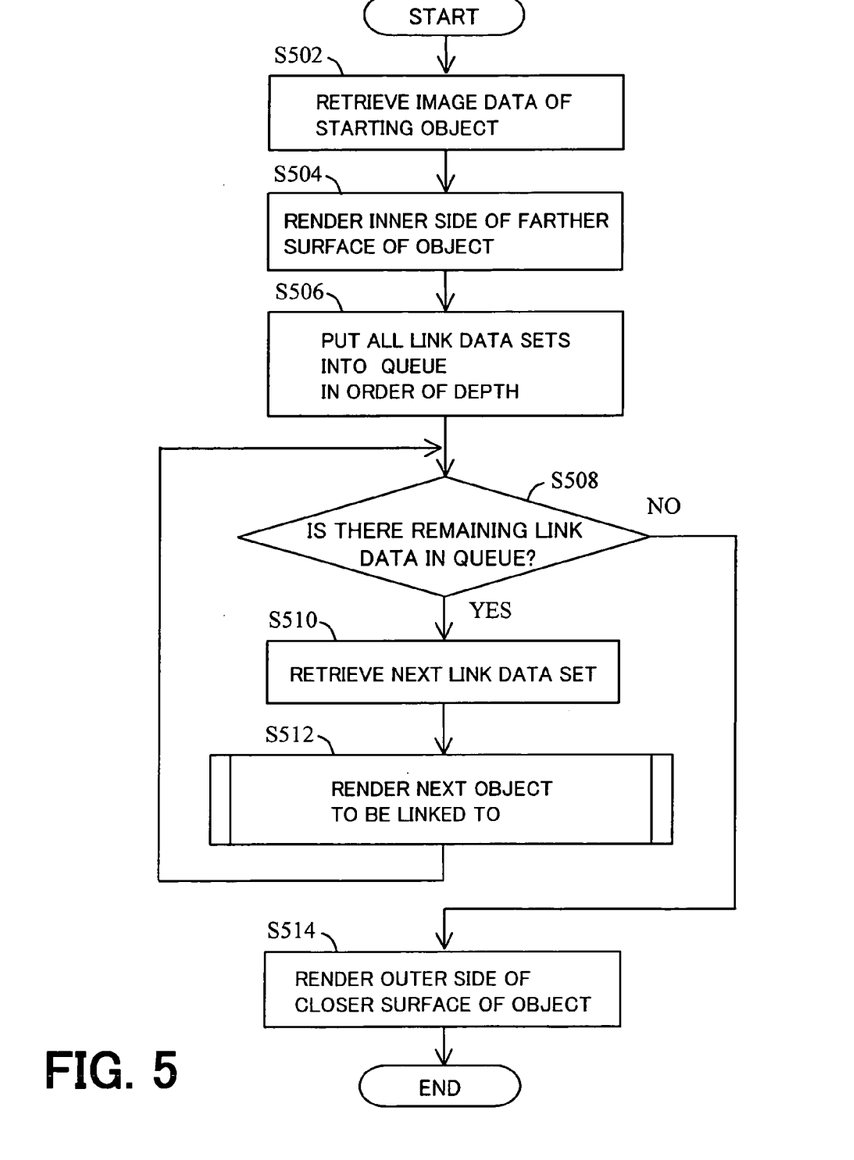
FIG. 5 shows a schematic flow chart for rendering the images of the objects in accordance with the invention.

At Step 406, in accordance with the subroutine shown in FIG. 5, the controller 103 renders the generated images of the plurality of objects shown as the example in FIG. 3 onto the two-dimensional frame memory area of the RAM 122, in accordance with the viewpoint and the field of view.

In the flow chart shown in FIG. 4, all of the object images are generated at Step 404, and then the generated images are rendered at Step 406. However, Step 404 may be eliminated, and, at Step 406, the images of the objects may be generated and stored in the RAM 122 in the order of rendering, while the generated images may be retrieved sequentially from the RAM 122 for rendering.

At Step 408, the controller 103 determines whether the field of view has been moved, i.e., whether the viewpoint and field of view data have been updated by the user. If the field of view has been moved, the procedure returns to Step 402. Thus, Steps 402 through 406 are repeated while the viewpoint and the field of view keep moving. When the field of view has not been moved, the procedure advances to Step 412.

At Step 412, the controller 103 determines whether it has received user's input data after a predetermined delay time (e.g., one second). If it has received the input data, the procedure advances to Step 414. When it has received no input data, the procedure returns to Step 412. Thus, the controller 103 waits for receipt of new input data.

At Step 414, the controller 103 determines whether the input data corresponds to a termination command. If the input data corresponds to the termination command, the procedure exits from the routine of FIG. 4. When it does not correspond to the termination command, the procedure returns to Step 402.

Steps 402 through 414 are executed at a rate of thirty or more times per second, to thereby generate sixty frames per second.

Figure 7A:
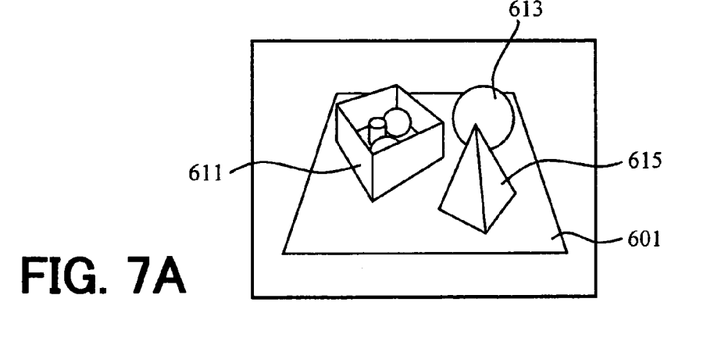
FIGS. 7A to 7C show an example of display screens of object images during the zooming-in operation, in accordance with movement of the viewpoint.
Figure 7B:
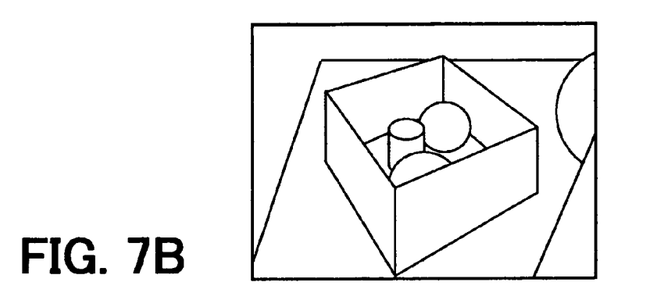
Figure 7C:
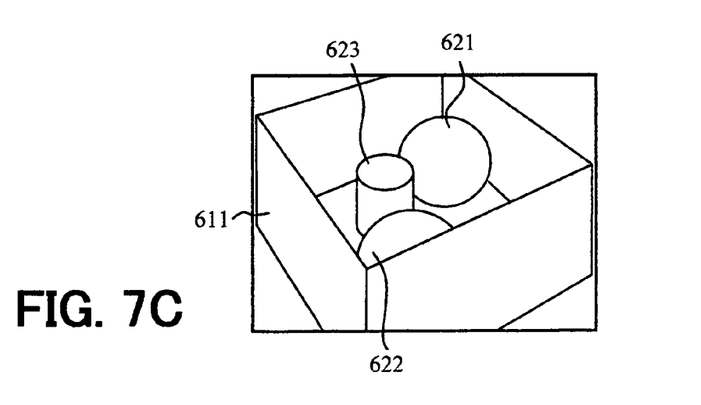

FIGS. 7A through 7C show an example of display screens of object images during the zooming-in operation, in accordance with movement of the viewpoint.

As shown in FIG. 7A, objects of a box 611 having no lid, a sphere 613 and a triangular cone 615 disposed on a rectangular object 601 are arranged in a virtual three-dimensional space. The rectangular object 601 is linked to the box 611, the sphere 613 and the triangular cone 615. As shown in FIG. 7C, the box 611 contains two spheres 621 and 622 and one circular cylinder 623. The box 611 is linked to the two spheres 621 and 622 and the circular cylinder 623.

As shown in FIGS. 7A through 7C, as the box 611 gets zoomed in, enlarged versions of the box 611 and the objects 621 to 623 within the box 611 are displayed.

FIG. 5 shows a schematic flow chart of a subroutine for rendering the images of the objects at Step 406 in FIG. 4 that is executed by the controller 103.

The flow chart in FIG. 5 is described below with reference to an example of rendering the images of the object 601 and the subsequent objects 611 to 615 and 621 to 623 to be linked thereto in FIGS. 7A through 7C.

At Step 502, the controller 103 retrieves the image data set of a starting or current object from the RAM 122. This image data set has been generated in accordance with the three-dimensional shape data (31 in FIG. 2) contained in the object data set of the corresponding object at Step 404 shown in FIG. 4, to store the generated image data set in the RAM 122. In the example of FIG. 7A, the controller 103 retrieves from the RAM 122 the image data set of the rectangle 601 as the starting object, which has been generated in accordance with the three-dimensional shape data within the object data set 301 (FIG. 3) of the rectangle 601.

At Step 504, the controller 103 renders a front or visible side surface of one of one or more polygon surfaces of the current object that is deepest or farthest from the viewpoint. In the example in FIG. 7A, the controller 103 renders a top or visible side surface of the rectangle 601. A bottom side surface of the rectangle is located behind the top side surface and is not visible from the viewpoint.

At Step 506, the controller 103 puts into a queue all of the link data sets contained in the object data set of the current object, in order of the depth or farness from the viewpoint. In the example in FIG. 7A, the controller 103 puts the three link data sets 213, 211 and 212 for the sphere 613, the box 611 and the triangular cone 615, respectively, that are contained in the object data set 301 of the rectangle 601, into a queue in this order.

At Step 508, the controller 103 determines whether there is a remaining link data set in the queue that indicates a link to another object which has not been rendered yet. If it determined that there is such a remaining link data set, the procedure advances to Step 510. If it is determined that there is no remaining link data set, the procedure advances to Step 514. In the example in FIG. 7A, the procedure advances to Step 510, since there remain in the queue the three link data sets 213, 211 and 212 that indicate the links to the respective objects 613, 611 and 615.

At Step 510, the controller 103 retrieves one of the remaining link data sets from the queue in the order. In the example in FIG. 7A, the controller 103 first retrieves the link data set 213 which indicates the link to the sphere 613.

At Step 512, the controller 103 retrieves from the RAM 122 the image data set of the object to be, linked to in accordance with the retrieved link data set, to thereby render an image of the object. For this purpose, the controller 103 first renders a front side surface of a farther polygon surface of the object from the viewpoint, and then renders a front side surface of a closer polygon surface thereof relative to the viewpoint. In the example in FIG. 7A, the controller 103 renders only the outer side surface of the closer hemisphere of the sphere 613 that is closer to the viewpoint, because the inner side surface of a farther hemisphere of the sphere 613 is not visible.

In a similar manner, Steps 508 through 512 are repeated for the number of times corresponding to the number of the remaining link data sets in the queue, to thereby render the images of the remaining objects to be linked to the starting object. In the example in FIG. 7A, the images of the box 611 and the triangular cone 615 are rendered in the order.

At Step 514, the controller 103 renders the front side surface of one of the polygon surfaces of the starting object that is closer to the viewpoint. In the example in FIG. 7A, however, the controller 103 does not render a polygon surface of the rectangle 601 that is closer to the viewpoint, because it has no closer polygon surface.

In the manner described above, in accordance with the flow chart shown in FIG. 5, the images of the objects linked to the starting object are rendered after the rendering of the front side surface of the farther polygon surface of the starting object and before the rendering of the front side surface of the closer polygon surface of the starting object. The starting object may have either a farther polygon surface or a closer polygon surface.

At Step 512, for rendering an image of one object which is linked to another object, the controller 103 separately executes the subroutine from Steps 502 to 514, assuming the one object as a new starting object. Thus the subroutine at Step 512 is nested. Thus an image of the other object linked to the new starting object is rendered between the first rendering of the front side surface of the farther polygon surface of the new starting object and the final rendering of the front side surface of the closer polygon surface of the new starting object.

In the example in FIG. 7A, when the controller 103 renders the image of the box 611 at Step 512, it separately executes Steps 502 through 514, assuming the box 611 as a starting object.

FIGS. 8A to 8E show an example of the process for rendering the images of the plurality of objects in accordance with the invention.

Referring to FIGS. 8A through 8E, the process for rendering the images of the box 611 as a starting object, the sphere 621, the circular cylinder 623 and the sphere 622 in accordance with the flow chart of FIG. 5 is described below.

At Step 502, the controller 103 retrieves the image data set of the box 611 from the RAM 122. This image data set has been generated in accordance with the shape data in the object data set 311 in FIG. 3 and stored in the RAM 122, at Step 404 shown in FIG. 4. When Step 404 in FIG. 4 is eliminated as described above, the image of the box 611 is generated and stored in the RAM 122 at Step 502 before the rendering.

Figure 8A:
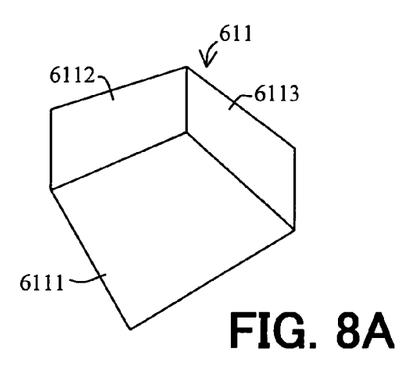
FIGS. 8A to 8E show an example of a process for rendering images of the plurality of objects in accordance with the invention.

At Step 504, the controller 103 renders three inner side surfaces 6111, 6112 and 6113 of three respective deeper polygon surfaces of the box 611, as shown in FIG. 8A.

At Step 506, the controller 103 puts into a queue three link data sets 221, 223 and 222 within the object data set 311 of the box 611 in this order that indicate respective links to the sphere 621, the circular cylinder 623 and the sphere 622, respectively.

At Step 508, the controller 103 first determines that there remain in the queue the link data sets 221, 223 and 222 that indicate the links to the respective objects which have not yet been rendered, and hence the procedure advances to Step 510.

At Step 510, the controller 103 retrieves a first link data set 221 from the queue.

Figure 8B:
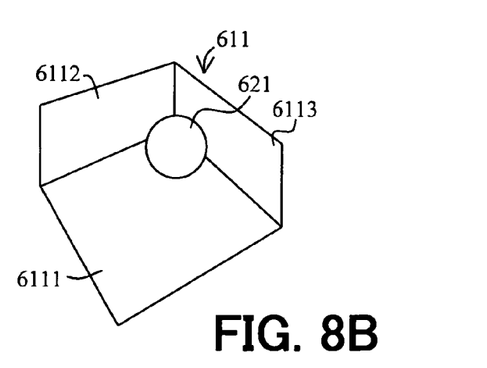

At Step 512, the controller 103 retrieves, from the RAM 122, the image data set of the sphere 621 which is linked by the link data set 221, and renders the image of the sphere 621 as shown in FIG. 8B. The inner side surface of the farther hemisphere of the sphere 621 is not visible, and hence an outer side surface of only a hemisphere closer to the viewpoint may be rendered. After that the procedure returns to Step 508. When Step 404 shown in FIG. 4 is eliminated as described above, the image of the sphere 621 is generated at Step 512 before the rendering.

Figure 8C:
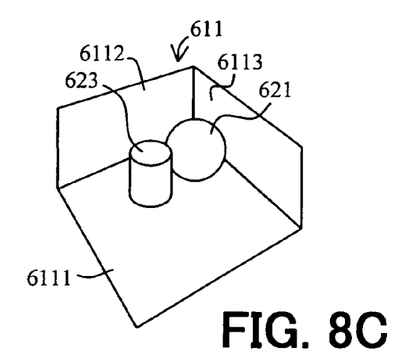
Figure 8D:
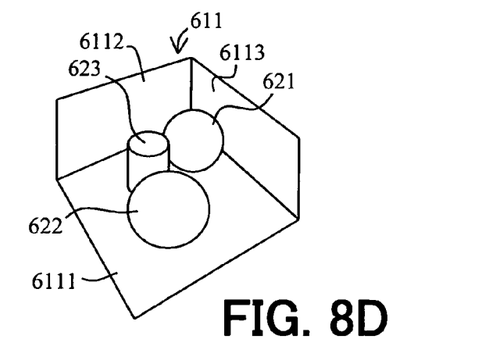

Similarly, Steps 508 through 512 are reiteratively executed for the circular cylinder 623 and the sphere 622, and the images of the circular cylinder 623 and the sphere 622 are rendered in the order as shown in FIGS. 8C and 8D.

Figure 8E:
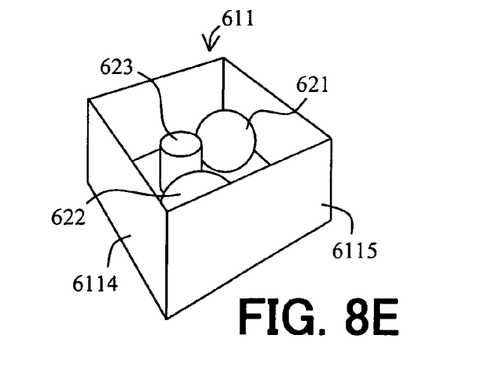

At Step 514, the controller 103 renders outer side surfaces 6114 and 6115 of closer ones of polygon surfaces of the box 611 as shown in FIG. 8E. In this manner, the images of the box 611, and the sphere 621, the circular cylinder 623 and the sphere 622 linked thereto are rendered.

It will be understood that execution of the flow chart in FIG. 5 results in sorting the objects in accordance with the hierarchy as shown in FIG. 3.

In the flow chart in FIG. 5, the hierarchical sorting is performed simultaneously with the rendering. Alternatively, the hierarchy as shown in FIG. 3 may be first determined, then the objects may be sorted in accordance with the hierarchy into the order of the distance from farther to closer objects relative to the viewpoint, and then the images of the objects may be rendered in the sorting order. In this case, when a particular object is linked to another object in accordance with a link data set, the other object is rendered after the rendering of the farther polygon surface of the particular object and before the rendering of the closer polygon surface of the particular object. Alternatively, when a particular object having both of a farther polygon surface and a closer polygon surface is linked to another object, the farther polygon surface and the closer polygon surface may be sorted together with the other object and the order of rendering may be determined accordingly. If an object having a plurality of polygon surfaces is linked to no subsequent object, generally it is not required to be separated into individual polygon surfaces for sorting.

Thus the images of subsequent objects to which one object is linked are rendered sequentially. For rendering an image of a current object linked to be linked from, an image of a subsequent object to be linked thereto is required to be rendered before or after the rendering of the image of the current object or in the course of the rendering. In other words, the images of the objects are locally depth-sorted in accordance with the links between the objects.

Figure 9A:
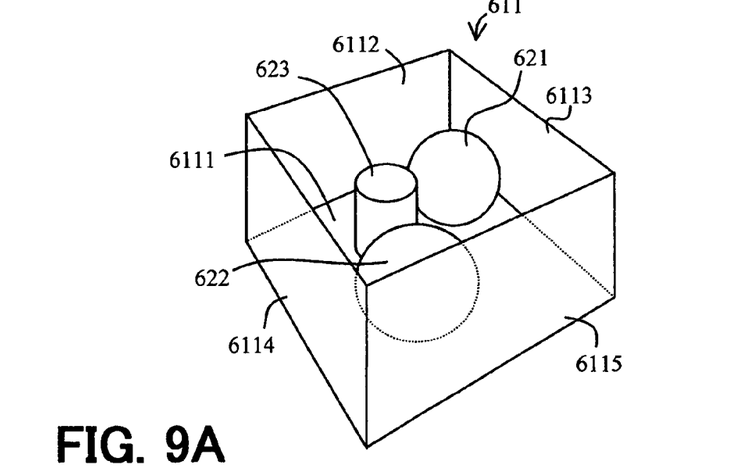
FIG. 9A shows a displayed image in which the object in FIG. 8E is semi-transparent.

FIG. 9A shows a displayed image in which the object 611 in FIG. 8E is semi-transparent. In FIG. 9A, the dotted lines indicate lines which can be seen through. In this case, for rendering the polygon surfaces 6114 and 6115 of the box 611, the colors of the polygon surfaces 6111 and 6112 therebehind and of the outer side surface of the closer hemisphere of the sphere 622 are mixed with the color of the polygon surface 6114 in overlapped portions thereof, while the colors of the polygon surfaces 6111 and 6113 and of the outer side surface of the closer hemisphere of the sphere 622 are mixed with the color of the polygon surface 6115 in overlapping portions thereof.

Figure 9B:
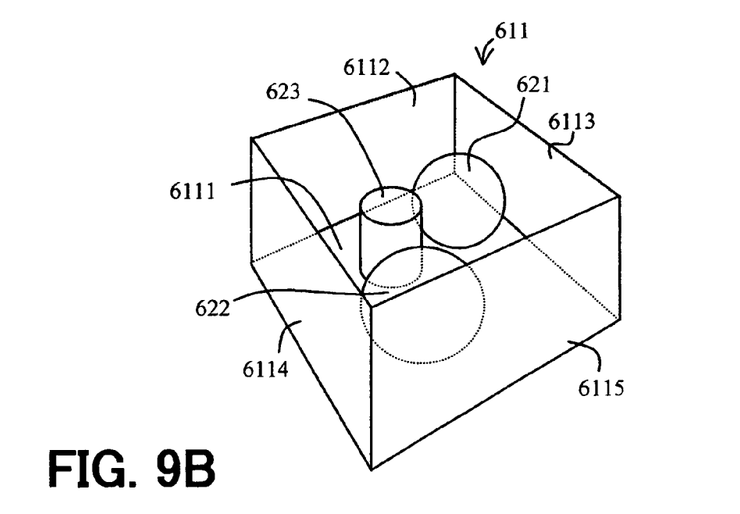
FIG. 9B shows a displayed image in which the objects in FIG. 9A are semi-transparent.

FIG. 9B shows a displayed image in which the objects 611, 621, 622 and 623 in FIG. 9A are semi-transparent. For rendering the image of the sphere 621, the colors of the polygon surfaces 6111, 6112 and 6113 therebehind are mixed with the color of the sphere 621 in overlapping portions thereof. For rendering the image of the circular cylinder 623, the images of the objects which lie behind the circular cylinder 623 and have been rendered previously are mixed with the image of the circular cylinder 623 in overlapping portions thereof. For rendering the image of the sphere 622, the images of the objects which lie behind the sphere 622 and have been rendered previously are mixed with the image of the sphere 622 in overlapping portions thereof. For rendering the polygon surfaces 6114 and 6115, the images of the objects which lie behind these polygon surfaces and have been rendered previously are mixed with the image of the sphere 622 in overlapping portions thereof.

By sorting the objects hierarchically as described above, the images of the objects are efficiently rendered. Thus not all polygon surfaces of all objects may be required to be sorted. In the examples described above, however, complex arrangement is not shown such that two objects intersect each other in a three-dimensional space. In such complex arrangement, each object may be divided into two object portions along an intersecting polygon surface, and the object portions may be sorted hierarchically together with other objects.

The above-described embodiments are only typical examples, and their modifications and variations are apparent to those skilled in the art. It is apparent that those skilled in the art can make various modifications to the above-described embodiments without departing from the principle of the invention and the accompanying claims.

What is claimed is:

1. An information processing apparatus for displaying a plurality of linked objects in a virtual three-dimensional space in accordance with field-of-view data, said field-of-view data defining a field-of-view and a viewpoint in said virtual space, said information processing apparatus comprising:

a memory for storing object data; and control means for generating images of said objects in accordance with said object data stored in said memory and rendering said generated images onto a two-dimensional frame, said control means rendering the image of one object and the image of a subsequent object to which said one object is linked, wherein the entire image of said subsequent object is rendered between a start and an end of rendering said one object, so that the rendering of the entire image of said subsequent object is initiated and also completed while the rendering of said one object is discontinued.

2. The information processing apparatus according to claim 1, wherein said control means renders the image or partial images of said one object and the image of said subsequent object in accordance with the distance from said viewpoint.

3. A program storage medium readable by a computer, tangibly embodying a program of instructions executable by the computer to perform a method for displaying a plurality of linked objects in a virtual three-dimensional space in accordance with field-of-view data, said field-of-view data defining a field-of-view and a viewpoint in said virtual space, said method comprising the steps of:

generating images of said objects in accordance with object data, said object data being stored in a memory, and rendering said generated images onto a two-dimensional frame, wherein the step of rendering comprises a sub-step of rendering the image of one object and the image of a subsequent object to which said one object is linked, wherein the entire image of said subsequent object is rendered between a start and an end of rendering said one object, so that the rendering of the entire image of said subsequent object is initiated and also completed while the rendering of said one object is discontinued.

4. The program storage medium according to claim 3, wherein the step of rendering comprises a sub-step of rendering the image or partial images of said one object and the image of said subsequent object in accordance with the distance from said viewpoint.

5. A method for displaying a plurality of linked objects in a virtual three-dimensional space in accordance with field-of-view data, said field-of-view data defining a field-of-view and a viewpoint in said virtual space, said method being performed by a computer and comprising the steps of:

generating images of said objects in accordance with object data, said object data being stored in a memory, and rendering said generated images onto a two-dimensional frame, wherein the step of rendering comprises a sub-step of rendering the entire image of one object and the image of a subsequent object to which said one object is linked, wherein the image of said subsequent object is rendered between a start and an end of rendering said one object, so that the rendering of the entire image of said subsequent object is initiated and also completed while the rendering of said one object is discontinued.

6. The method according to claim 5, wherein the step of rendering comprises a sub-step of rendering the image or partial images of said one object and the image of said subsequent object in accordance with the distance from said viewpoint.

7. An information processing apparatus for displaying a plurality of linked objects in a virtual three-dimensional space in accordance with field-of-view data, said field-of-view data defining a field-of-view and a viewpoint in said virtual space, said information processing apparatus comprising;
 a memory for storing object data; and
 a control device generating images of said objects in accordance with said object data stored in said memory and rendering said generated images onto a two-dimensional frame,
 said control device rendering the image of one object and the image of a subsequent object to which said one object is linked, wherein the entire image of said subsequent object is rendered between a start and an end of rendering said one object, so that the rendering of the entire image of said subsequent object is initiated and also completed while the rendering of said one object is discontinued.

* * * * *